(12) United States Patent
Schenk

(10) Patent No.: US 9,649,697 B2
(45) Date of Patent: May 16, 2017

(54) POWER DRILL

(71) Applicant: ROEHM GmbH, Sontheim (DE)

(72) Inventor: Peter Schenk, Niederstotzingen (DE)

(73) Assignee: ROEHM GMBH, Sontheim (DE)

( * ) Notice: Subject to any disclaimer, the term of this patent is extended or adjusted under 35 U.S.C. 154(b) by 167 days.

(21) Appl. No.: 14/749,188

(22) Filed: Jun. 24, 2015

(65) Prior Publication Data

US 2015/0290719 A1    Oct. 15, 2015

Related U.S. Application Data

(62) Division of application No. 13/454,136, filed on Apr. 24, 2012, now Pat. No. 9,174,281.

(30) Foreign Application Priority Data

Apr. 29, 2011   (DE) .......................... 10 2011 002 331

(51) Int. Cl.
| | | |
|---|---|---|
| *B23B 31/12* | (2006.01) | |
| *B23B 31/26* | (2006.01) | |
| *B23B 31/10* | (2006.01) | |

(52) U.S. Cl.
CPC ...... *B23B 31/1238* (2013.01); *B23B 31/1253* (2013.01); *B23B 31/26* (2013.01); *B23B 31/102* (2013.01); *B23B 2231/06* (2013.01); *B23B 2260/07* (2013.01); *Y10T 279/17* (2015.01); *Y10T 279/17615* (2015.01); *Y10T 279/27* (2015.01); *Y10T 279/3451* (2015.01); *Y10T 408/65* (2015.01)

(58) Field of Classification Search
CPC ............ B23B 31/1238; B23B 31/1207; B23B 31/123; B23B 2231/06; B23B 2260/07; B23B 2260/11; Y10T 279/17632; Y10T 279/17623; Y10T 279/17615; Y10T 279/32; Y10T 408/65; Y10T 408/95; Y10S 279/902

See application file for complete search history.

(56) References Cited

U.S. PATENT DOCUMENTS

| | | | | |
|---|---|---|---|---|
| 913,059 | A * | 2/1909 | Savage | ............... B23B 31/1238 279/62 |
| 4,260,169 | A * | 4/1981 | Hall | ..................... B23B 31/1238 279/62 |
| 4,526,497 | A * | 7/1985 | Hatfield | .............. B23B 31/1238 279/134 |
| 7,021,400 | B2 * | 4/2006 | Oretti | .................... B23B 31/123 173/176 |
| 8,057,134 | B2 * | 11/2011 | Mok | ..................... B23B 31/123 279/62 |
| 8,075,229 | B2 * | 12/2011 | Mok | ..................... B23B 31/123 279/62 |
| 8,387,719 | B2 * | 3/2013 | Scrimshaw | ......... B23B 31/1238 173/104 |
| 2009/0016834 | A1 * | 1/2009 | Scrimshaw | ........... B23B 31/123 408/139 |

* cited by examiner

*Primary Examiner* — Eric A Gates
*Assistant Examiner* — Chwen-Wei Su
(74) *Attorney, Agent, or Firm* — Andrew Wilford

(57) ABSTRACT

A drilling apparatus has a housing, a motor in the housing, a drive spindle rotatable about an axis on the housing, a chuck body, and a plurality of jaws shiftable in the chuck body. First and second elements interconnected by a screw thread and engaged between the body and the jaws for shifting the jaws on the housing. A drive sleeve rotationally fixed to the first element is drivable by the motor.

4 Claims, 10 Drawing Sheets

POWER DRILL

CROSS REFERENCE TO RELATED APPLICATIONS

This application is a division of U.S. patent application Ser. No. 13/454,136 filed 24 Apr. 2012 with a claim to the priority of German patent application 10 2011 002 331.3 filed 29 Apr. 2011

FIELD OF THE INVENTION

The present invention relates to a power drill.

BACKGROUND OF THE INVENTION

A typical power drill has a motor and a drive spindle rotatably mounted in a housing, and a drilling chuck with a chuck body in which displaceable jaws are guided by a threaded connection formed between a threaded drive member and a threaded stem element.

A drilling chuck of the kind described above is disclosed in DE 10 2009 026 075 (U.S. Pat. No. 9,050,660). It has a housing, a tubular drive spindle extending forward along an axis from the housing, a drive motor in the housing and permanently connected to the spindle for rotating the spindle about the axis, and a chuck body carried on the spindle outside the housing. An internally threaded sleeve element is provided in the spindle, and a driver, sleeve, and holder carried on the chuck body form a plurality of angularly spaced angled guides receiving respective jaws axially rearwardly braced on the driver. A stem element on the driver is threaded into the sleeve element. A rod rotationally coupled to the one of the elements extends axially through the spindle so that relative rotation of the one element and the stem shifts the jaws in the guides. A coupling rotationally fixed to the rod is axially shiftable between an adjustment position engaging the housing and a drilling position engaging the chuck body. Interfitting formations on the coupling, the housing, and the chuck body rotationally lock the one element to the rod and couple the rod to the housing in the adjustment position and to the chuck body in the drilling position.

In the drilling configuration, the coupling rod is rotationally connected to the tubular drive spindle so that, in the tightening/loosening or adjustment position that serves to displace the jaws, the coupling rod is decoupled from the tubular drive spindle and is rotationally connected to the housing. In doing so, the coupling rod and the threaded stem element are fixed with respect to the rotation of the tubular drive spindle driven by the motor. The tubular drive spindle is rotationally connected to the chuck body and to the jaw holder so that the threaded drive member is screwed in and out on rotation of the chuck body, and the jaws are therefore displaced by the motor of the power drill. This is a possible way of adjusting the jaws with the help of the power drill drive. In doing so however, it is difficult for a user to fit a drilling tool in the power drill between the jaws, as the chuck body, which is on the outside of the power drill and is driven by the power drill motor, rotates during the clamping process.

OBJECTS OF THE INVENTION

It is therefore an object of the present invention to provide an improved power drill.

Another object is the provision of such an improved power drill that overcomes the above-given disadvantages, in particular that also provides a progressive integration of the drilling chuck with the power drill.

SUMMARY OF THE INVENTION

With a power drill of the kind described above, the object is achieved by providing a drive sleeve that is rotationally connected to the threaded stem element and that can be driven by the motor. This has the advantage that the power drill can be produced more easily, more simply and more cheaply. In addition, the compact design of the power drill guarantees that, in the drilling configuration, rotation of the threaded drive member with respect to the threaded stem element is blocked. With the power drill according to the invention, an interlock such as is shown in EP 0 017 748 [U.S. Pat. No. 4,302,021) that is intended to prevent rotation of the chuck body relative to the parts that release the jaws is therefore no longer necessary. Furthermore, a limitation of the clamping force, such as is often provided with self-tightening drill chucks, is no longer necessary. At the same time, in the drilling configuration, the torques opposing the drilling direction acting on the drilling chuck due to the drilling tool cause no relative movement of the threaded drive member relative to the threaded stem element. Incorrect clamping of the drilling tool, which would prevent the drilling chuck from being easily released, cannot occur.

It has been shown to be useful when a gear arrangement, preferably a planetary-gear transmission, is provided between the motor and the drive sleeve. This enables the highest possible torques to be transmitted to the drive spindle and, in the drilling configuration, also to the threaded stem element.

At the same time, it is particularly beneficial when the planetary-gear transmission has a sun gear that can be driven by the motor and that engages with at least one planet gear that is mounted on a planet carrier connected to the drive sleeve, and that for its part interacts with a ring gear associated with the housing. This enables the power drill drive to be applied directly to the sun gear, as a result of which the planet carrier drives the drive sleeve by the planet gear that rolls on the nonrotating ring gear.

It has been shown to be beneficial that the threaded stem element is formed in two parts from a threaded sleeve and an axially displaceable coupling rod that is rotationally connected thereto and is guided in the drive spindle designed as a tubular drive spindle, when the coupling rod has a coupling spur gear and the tubular drive spindle has a spindle spur gear, and when the drive sleeve and possibly the gear arrangement are axially displaceably mounted in the housing. The spindle spur gear and the coupling spur gear make it very easy to produce a torque-transmitting connection between the drive sleeve and the tubular drive spindle or coupling rod.

A particular embodiment is characterized in that the drive sleeve has internal gear teeth and can reversibly be brought from an adjustment position, in which the coupling spur gear is engaged with the internal gear teeth, into a drilling configuration, in which the coupling spur gear and the spindle spur gear are engaged with the internal gear teeth. In the adjustment position, the spindle spur gear is also engaged with the ring gear, as a result of which the tubular drive spindle is rotationally connected to the housing and to the chuck body. This ensures that the coupling rod rotates relative to the tubular drive spindle. The power drill can very easily be switched back and forth between the adjustment position and the drilling configuration by the axial displacement of the drive sleeve. Here too, rotation of the threaded drive member relative to the threaded stem element is prevented by the spur gear and the spindle spur gear being driven by the drive sleeve.

An alternative preferred embodiment of the invention is characterized in that the drive sleeve is securely connected to the coupling spur gear and can reversibly be brought from an is adjustment position, in which a crown gear provided on the coupling rod is not engaged with the spindle crown gear of the tubular drive spindle, into a drilling configuration, in which the crown gear is engaged with the spindle crown gear. In this case, in the adjustment position, the spindle spur gear is also engaged with the ring gear, which facilitates the rotation of the coupling rod relative to the tubular drive spindle. Axial displacement of the drive sleeve produces a rotatably fixed connection between the tubular drive spindle and the coupling rod driving the threaded sleeve, as a result of which an easy changeover is provided between the drilling configuration and the adjustment position.

Expediently, an adjusting sleeve, which effects on axial displacement of the gear arrangement and the drive sleeve, is associated with the housing. This enables the user to switch between the adjustment position and the drilling configuration manually or even electrically. For manual displacement, it can be expedient to provide a control cam in the housing. It is also conceivable to use a changeover between the two configuration positions that is realized with a solenoid, as shown in DE 10 2009 026 075.

At the same time, it has been shown to be particularly beneficial when the adjusting sleeve has at least one adjusting element that interacts with the ring gear, as a result of which the planetary-gear transmission can be easily displaced axially by the adjusting sleeve.

It has been shown to be beneficial that a cover cap that lies axially in front of the housing and is releasably connected thereto is associated with the housing, as this prevents drilling dust or other contamination getting into is sensitive parts, such as into the gear arrangement of the power drill for example.

At the same time, it is advantageous when at least one bearing, which ensures the true running accuracy of the drilling chuck and therefore of the whole power drill, is provided between the drive spindle and the housing.

A further particularly preferred embodiment is characterized in that the chuck body is designed as a chuck sleeve and has at least one chuck crown gear that lies radially inward, that a spindle rod, which can be driven by the motor and that can be brought from an adjustment position in which at least one spindle rod crown gear of the spindle rod is engaged with at least one planet gear and is not engaged with the chuck crown gear into a drilling configuration in which the spindle rod crown gear is engaged with the chuck crown gear, is axially displaceably guided in the chuck body, and that the drive sleeve is in the form of a ring gear that is engaged with the planet gear. Here, only one part, namely the spindle rod, is axially displaced in order to switch back and forth between the adjustment position and the drilling configuration. In so doing, the spindle rod serves as a central gear that drives the planet gear, which for its part drives the drive sleeve that is in the form of a ring gear. The threaded stem element engaged with the threaded drive members provided on the jaws is driven by the drive sleeve.

At the same time, it has been shown to be particularly beneficial when a spring is arranged between the chuck sleeve and the spindle rod and supports these axially. This causes a resetting force of the spring to act permanently on the spindle rod, as a result of which the power drill is forced into the drilling configuration.

It is also advantageous when a coaxially arranged driver ring is associated with the spindle rod. This driver ring provides an additional guide for the spindle rod. In the clamping mode, the driver ring is engaged in a rotatably fixed manner with the chuck sleeve so that it is securely held and the relative rotation of the chuck sleeve relative to the spindle rod is facilitated. The driver ring can also have external gear teeth that, in the drilling mode, engage with housing gear teeth formed on the housing.

Furthermore, it has been shown to be beneficial when an adjusting sleeve, which effects the axial displacement of the spindle rod, is associated with the housing, where here too a mechanical, electrical or manual displacement is possible.

Finally, it has been shown to be preferable when the adjusting sleeve has at least one adjusting element that interacts with the driver ring, as this ensures a guided and reliable displacement of the spindle rod.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
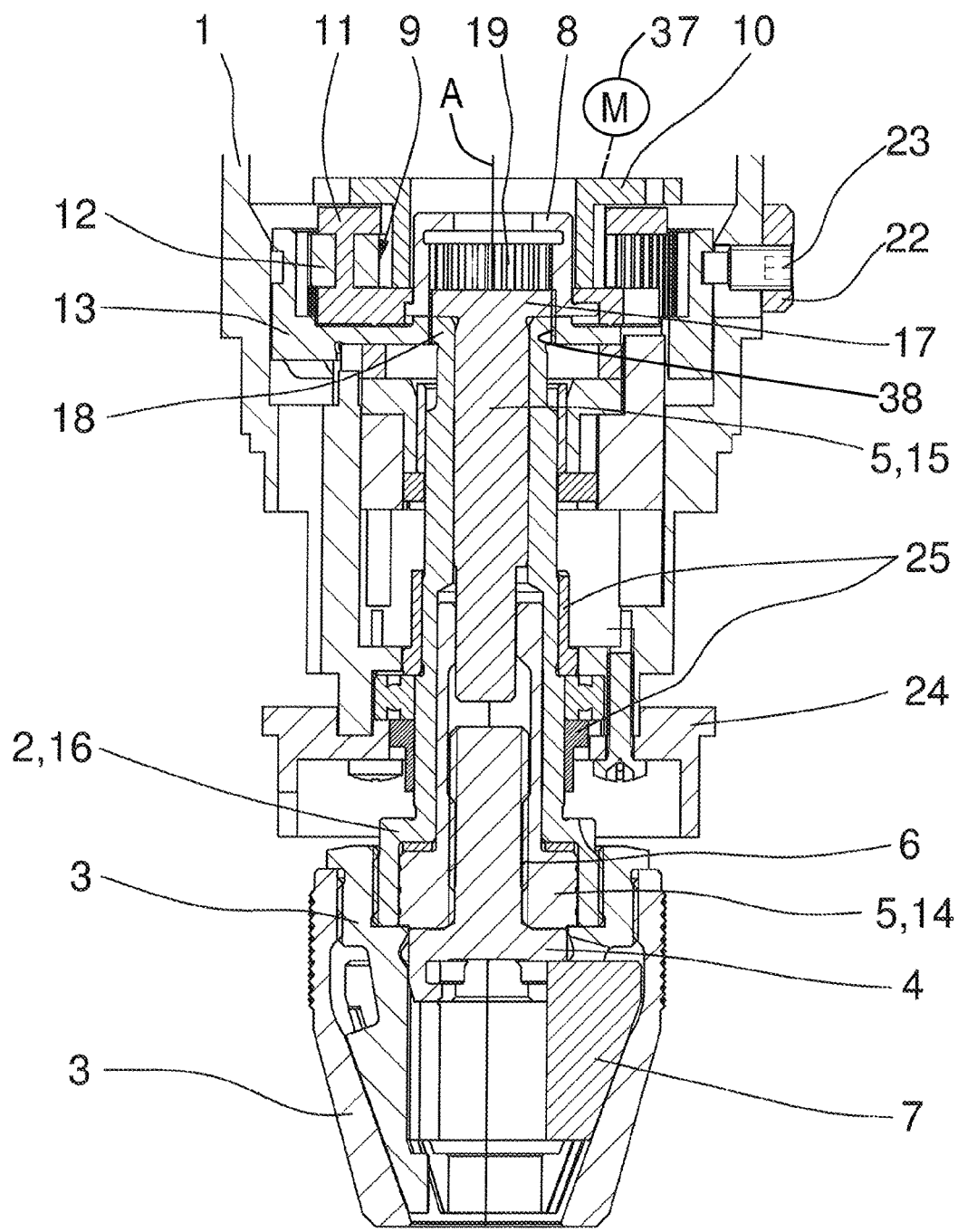
FIG. 1 is a partly schematic axial section through a first drill according to the invention, in the clamping position.
Figure 2:
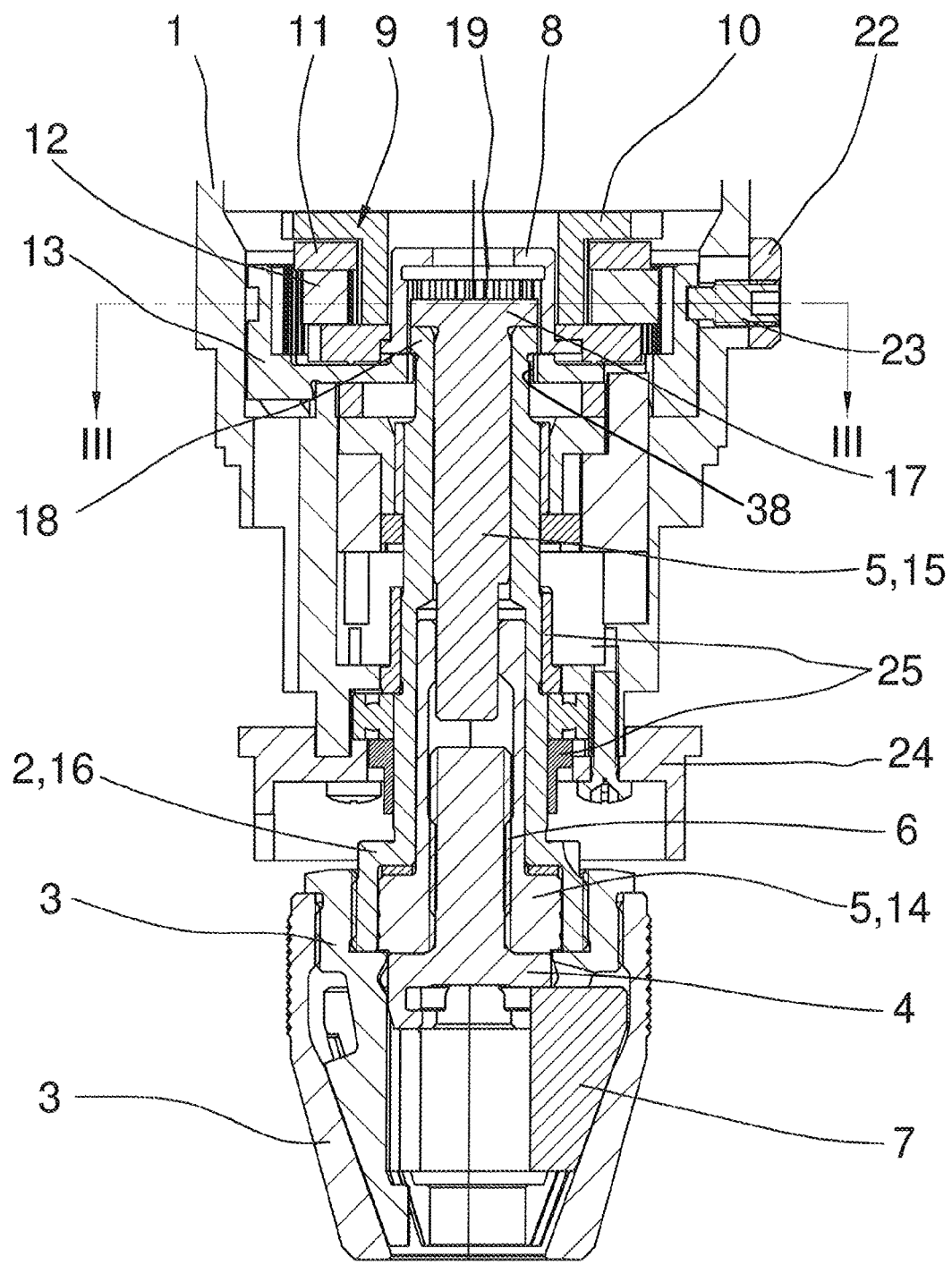
FIG. 2 is a view like FIG. 1 but in the drilling position.
Figure 3:
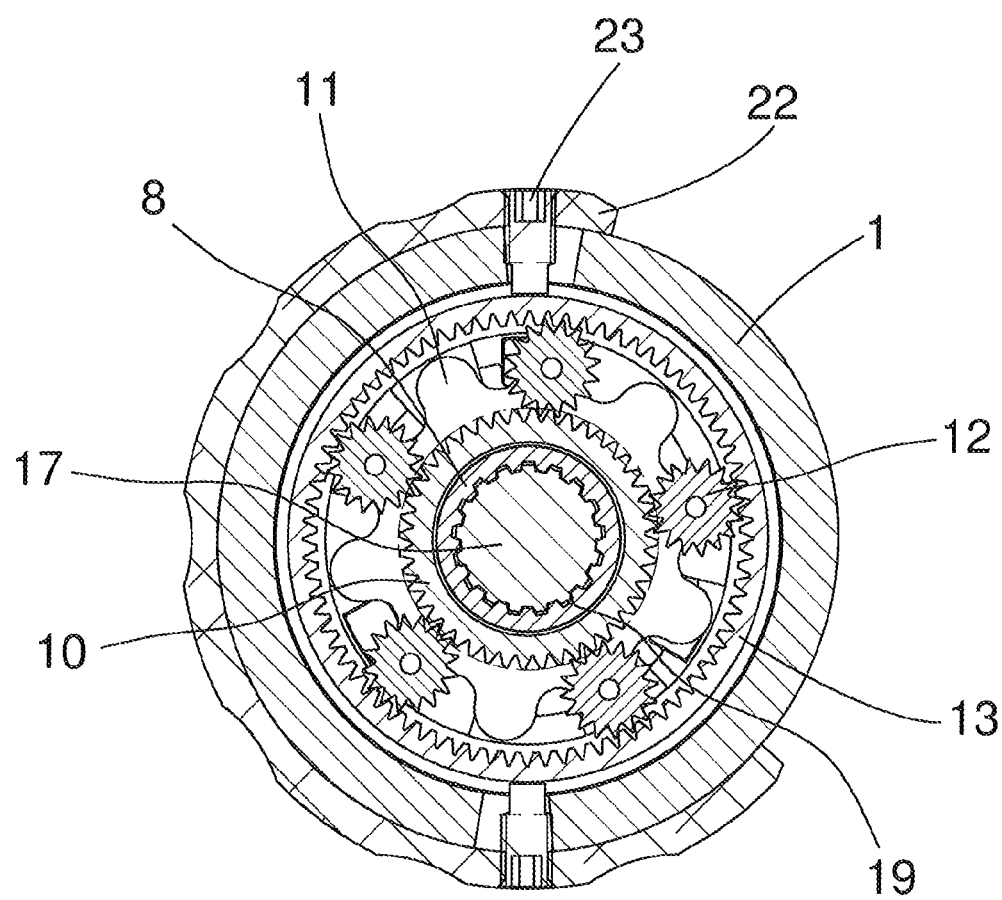
FIG. 3 is a section taken along line of FIG. 2.

As seen in FIGS. 1 to 3 a first preferred embodiment of the power drill consists of a power drill having a motor 37 and a drive spindle 2 rotatable in a housing 1 about its axis A and fixed at its front to a chuck body 3 in which jaws 7 can be shifted axially and radially by a threaded connection 6 formed between a threaded drive member 4 and a threaded stem element 5. The jaws 7 can shift axially and radially in the chuck body 3 but cannot move angularly relative to it or to the drive member 4. On the other hand, the stem element 5 can as described below rotate relative to the chuck body 3 but not move axially or radially therein or can be rotationally fixed to the chuck body 3.

In addition as also shown in FIG. 3, a planetary-gear transmission 9 has a sun gear 10 that is rotatable about the axis A by the motor 37, five planet gears 12 meshing radially inward with the sun gear 10 and radially outward with a ring gear 13 that is rotationally fixed on the housing 1 but as described below limitedly axially displaceable thereon. The planet gears 12 are mounted on a planet carrier 11 rotatable about the axis A and connected to a drive sleeve 8 rotationally coupled to the stem element 5.

The threaded stem element 5 is formed in two relatively nonrotatable parts from a threaded sleeve 14 and an axially displaceable coupling rod 15 both centered on and rotatable about the axis A with the rod 15 inside the sleeve 14. The sleeve 14 is connected by the screwthread 6 to the drive member 4 and is axially nondisplaceable in the chuck body 3. The sleeve 14 and rod 15 are rotationally coupled to each other, for instance by complementary polygonal cross sections. The sleeve 14 and rod 15 are rotatable in the tubular drive spindle 2 that has a radially enlarged front end 16 against which the sleeve 14 is axially rearwardly braced. The coupling rod 15 has at its rear end a coupling spur gear 17, and the tubular drive spindle 2 has immediately thereadjacent at its rear end a similarly toothed spindle spur gear 18.

The planetary-gear transmission 9 and the drive sleeve 8 are axially displaceably relative to the housing 1, the spindle 2, the chuck body 3, and the stem element 5. An adjusting sleeve 22 is externally carried and axially shiftable on the housing 1 and is coupled to the transmission 9 and sleeve 8 to axially shift them relative to the housing 10. To this end, radially extending screws 23 couple the adjusting sleeve 22 to the ring gear 13.

The housing 1 is provided with a cover cap 24 axially just behind the chuck body 3, on the side of the power drill facing away from the motor, and releasably connected to the housing 1. Bearings 25 are provided between the drive spindle 2 and the housing 1.

The drive sleeve 8 is formed with internal gear teeth gear 19 complementary to the gears 17 and 18 and axially long enough to accommodate both of them. Immediately therebelow, the ring gear 13, which is axially limitedly shiftable in the housing 1 with the rest of the planetary transmission 8 but not rotatable on the housing 1, is also formed with a ring of internal teeth 38 meshable with the teeth of the gear 17. The transmission 8 and the gear teeth 19 and 38 can move axially between a rear position shown in FIG. 1 with the gear 17 meshing with the teeth 19 and the gear 18 meshing with the teeth 38, and a front position shown in FIG. 2 with both of the gears 17 and 18 meshing with the teeth 19.

In FIG. 1, the structure is shown in the adjustment position in which the internal gear teeth 19 of the drive sleeve 8 are in mesh with the coupling spur gear 17 and the spindle spur gear 18 is meshed with the teeth 38 of the nonrotating ring gear 13. Here, the force of the motor 37 is transmitted as usual via a machine spindle to the sun gear 10 of the planetary-gear transmission 9. This drives the planet gears 12 mounted on the planet carrier 11 that roll on the ring gear 13 rotationally fixed to the housing 1, thereby rotating the drive sleeve 8. For its part, the drive sleeve 8, which is rotationally connected to the planet carrier 11, transmits the force to the coupling spur gear 17, as a result of which the coupling rod 15 and the threaded sleeve 14 are both rotated. As the spindle spur gear 18 and therefore the tubular drive spindle 16 are rotationally connected via the ring gear 13 to the housing 1, this enables relative rotation of the threaded sleeve 14 relative to the tubular drive spindle 16, and the threaded stem element 4 is displaced by the threaded connection 8 axially forward, i.e. in a direction away from the motor 37, or axially backward, taking with it the jaws 7. Depending on the direction of rotation of the sun gear 10, the chuck is tightened or loosened.

FIG. 2 shows the embodiment in the drilling configuration in which the drive sleeve 8 and the planetary-gear transmission 9 are moved axially forward so that the coupling spur gear 17 and the spindle spur gear 18 both mesh with the internal gear teeth 19 of the drive sleeve 8. Here too, the force of the motor 37 is transmitted to the sun wheel 10 of the planetary-gear transmission 9. This drives the planet gears 12 mounted on the planet carrier 11 that roll on the ring gear 13 that is rotationally connected to the housing 1. Here, the drive sleeve 8 is displaced axially forward by the displacement of the adjusting sleeve 22. The drive sleeve 8 is driven by the planetary-gear transmission 9 and is now rotationally connected to the coupling rod 15 and to the tubular drive spindle 16 by engagement of the coupling spur gear 17 and the spindle spur gear 18 with the internal gear teeth 19 of the drive sleeve 8 so that the force of the motor is transmitted directly to the coupling rod 15 and the tubular drive spindle 16. This prevents relative rotation of the threaded sleeve 14 relative to the tubular drive spindle 16 and the displacement of the jaws 7. This is the drilling position.

Figure 4:
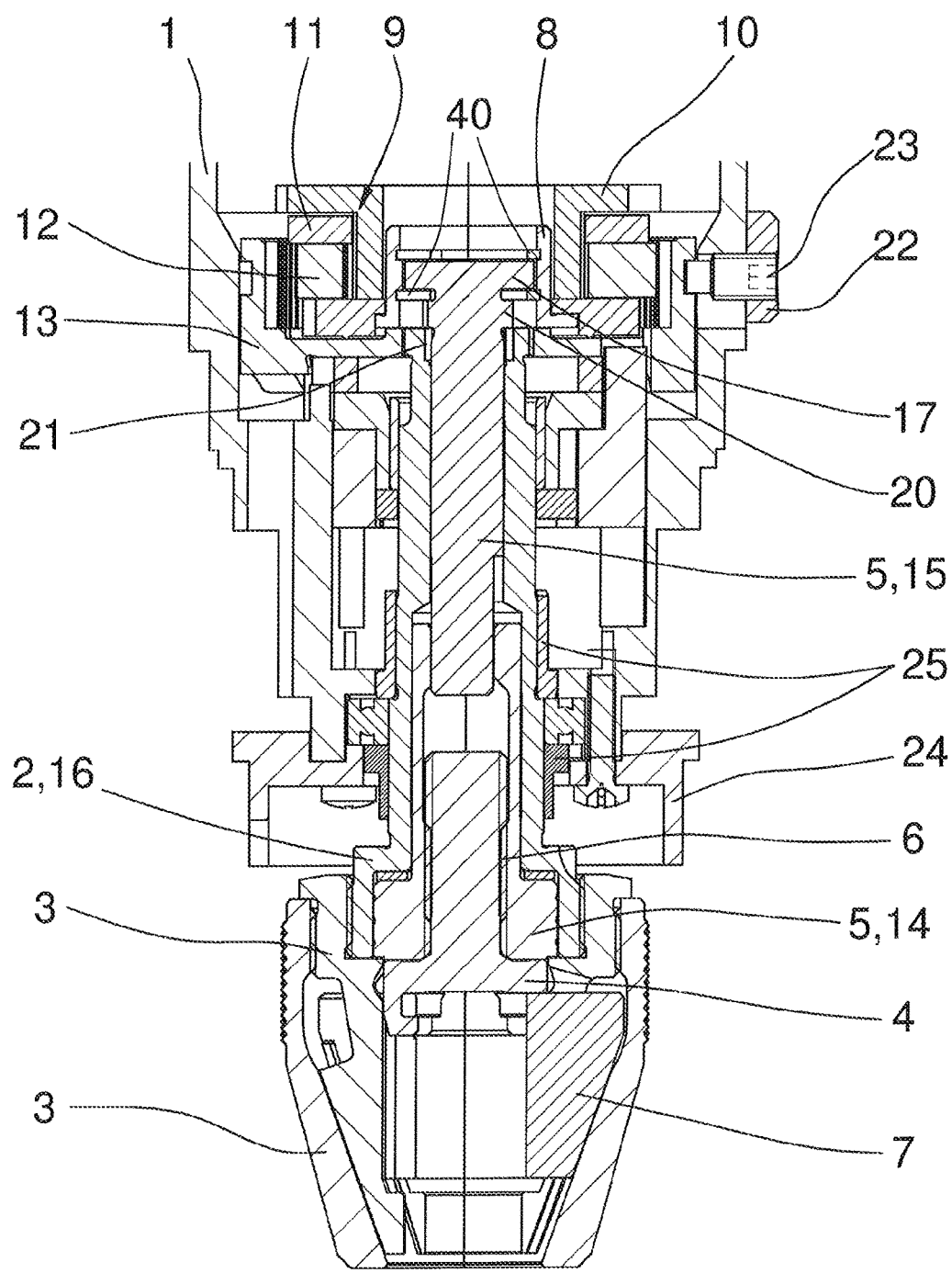
FIGS. 4 and 5 are views like respective FIGS. 1 and 2 of a second drill according to the invention.
Figure 5:
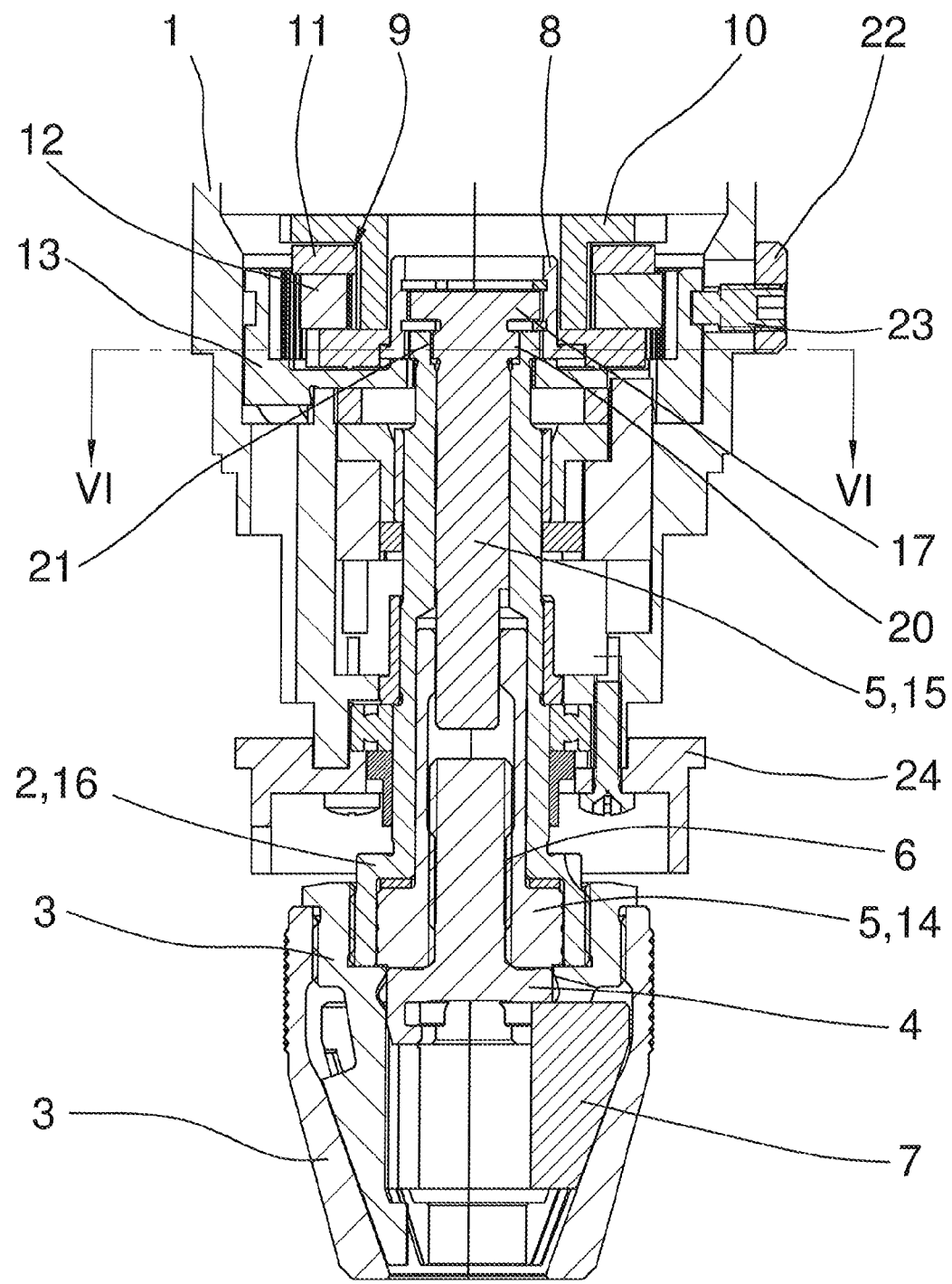
Figure 6:
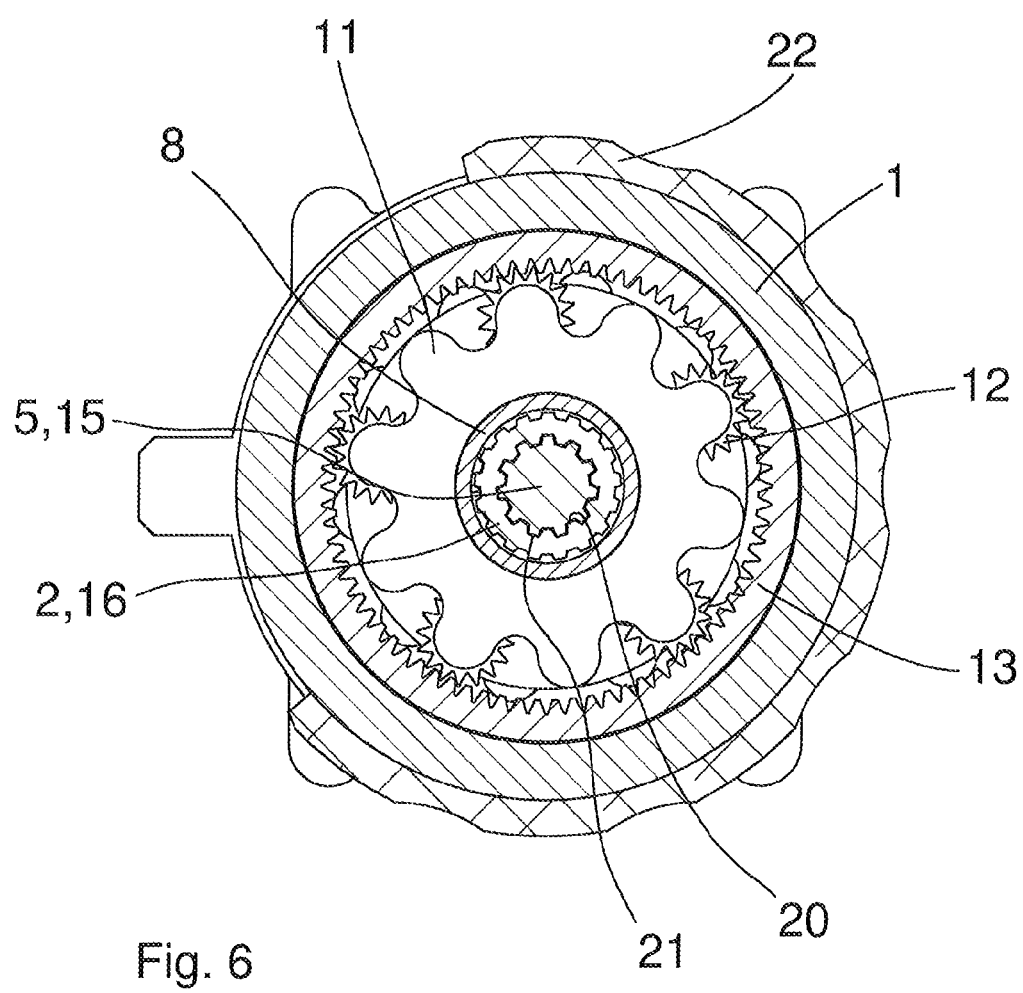
FIG. 6 is a section taken alone line VI-VI of FIG. 5.

A further preferred embodiment is shown in FIG. 4 to FIG. 6. Here, the drive sleeve 8 is fixed by snap rings 40 to the coupling spur gear 17, and the coupling rod 15 has an external crown gear 20. For its part, the tubular drive spindle 16 has an internal spindle crown gear 21.

FIG. 4 shows the embodiment in the adjustment position, in which the crown gear 20 provided on the coupling rod 15 is not engaged with the spindle crown gear 21 of the tubular drive spindle 16. In this embodiment, the motor 37 rotates the sun gear 10 of the planetary-gear transmission 9 to drive the planet gears 12 mounted on the planet carrier 11 that roll on the ring gear 13 rotationally connected to the housing 1. The planet carrier 11 is rotationally connected to the drive sleeve 8 and therefore to the coupling rod 15 that as a result is driven by the motor 37, regardless of the axial position of the transmission 9 and sleeve 8. The tubular drive spindle 16 engages with the teeth 39 of the ring gear 13 that is rotationally connected to the housing 1. The adjusting sleeve 22 is displaced axially backward so that the crown gear 20 of the coupling rod 15 is not engaged with the spindle crown gear 21. As a result, only the coupling rod 15 is driven by the motor 37 and not the tubular drive spindle 16. In this adjustment position, relative rotation is possible between the tubular drive spindle 16 and the threaded sleeve 14, so that, in this embodiment, the jaws 7 are also displaced by the axial displacement of the threaded drive member 4.

On the other hand, in FIG. 5, the power drill is shown in the drilling configuration where the crown gear 20 meshes with the spindle crown gear 21. In this configuration, the motor 37 rotates the sun gear 10 of the planetary-gear transmission 9 to drive the planet gears 12 that roll on the ring gear 13 rotationally connected to the housing 1. The adjusting sleeve 22 is now displaced axially forward, as a result of which the planetary-gear transmission 9 and the drive sleeve 8 with the coupling rod 15 are also displaced axially forward, and the ring gear 13 and the tubular drive spindle 16 are disengaged. In this drilling configuration, the crown gear 20 of the coupling rod 15 is engaged with the spindle crown gear 21, as a result of which the force of the motor 37 is transmitted to both the coupling rod 15 and to the tubular drive spindle 16. Relative rotation between the tubular drive spindle 16 and the threaded sleeve 14 is prevented.

FIG. 6 shows that, in this illustrated embodiment, the drive sleeve 8 also has internal gear teeth 19. In addition, the adjusting sleeve 22 does not have to fully surround the power drill.

A further preferred embodiment is shown in FIG. 7 to FIG. 11 where the chuck body 3 is a sleeve 26 and has two axially spaced rings of internal crown-gear teeth 27. A spindle rod 28, which can be driven by the motor 37 and that in the illustrated embodiment has a socket 32 for a drive tool, is axially displaceable in the chuck body 3 and is formed with three axially spaced rings of external crown-gear teeth 29. In this embodiment, the lowermost ring of external crown-gear teeth 29 of the spindle rod 28 forms the sun gear 13 of the planetary-gear transmission.

Figure 7:
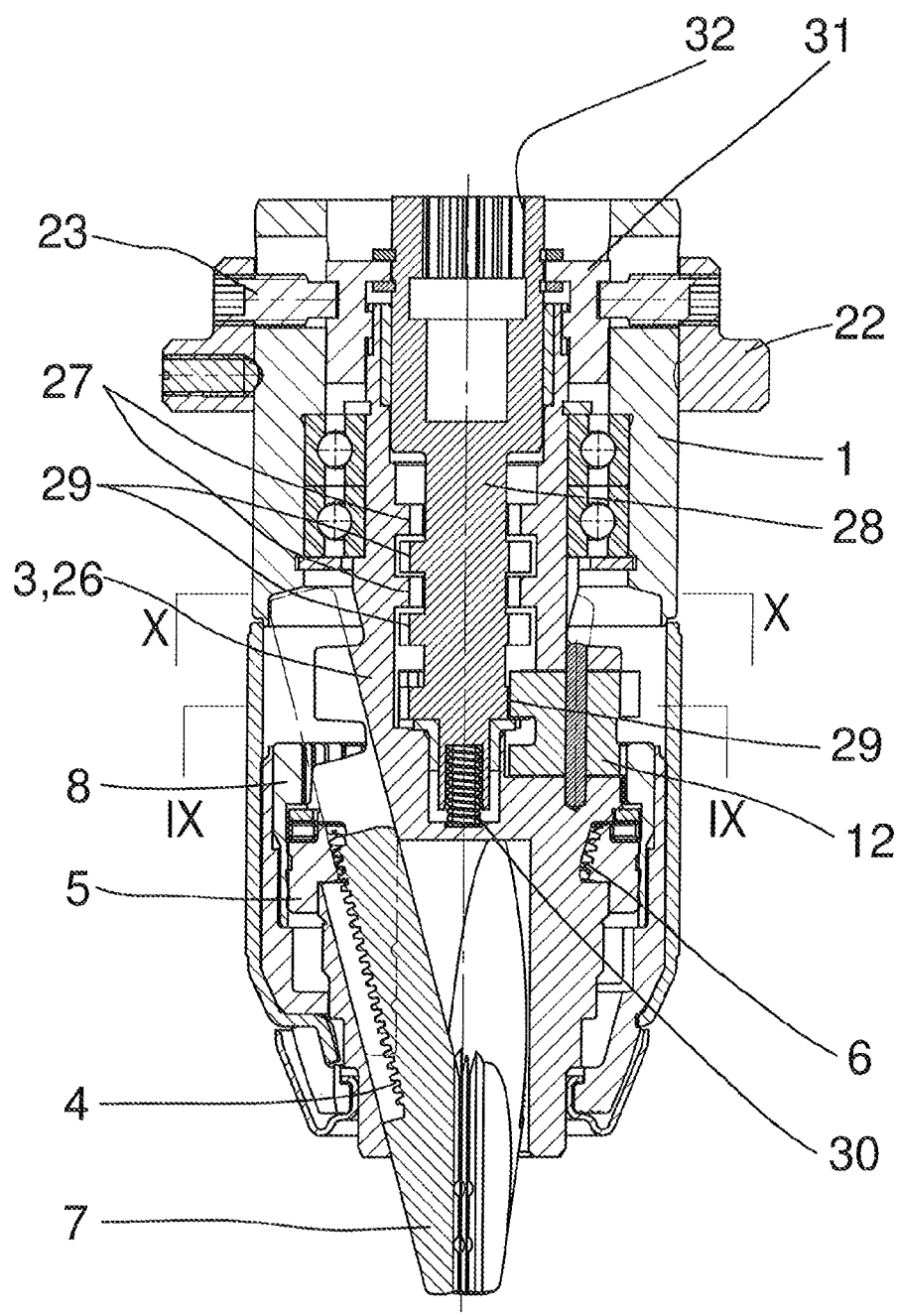
FIGS. 7 and 8 are views like respective FIGS. 1 and 2 of a third drill according to the invention.
Figure 8:
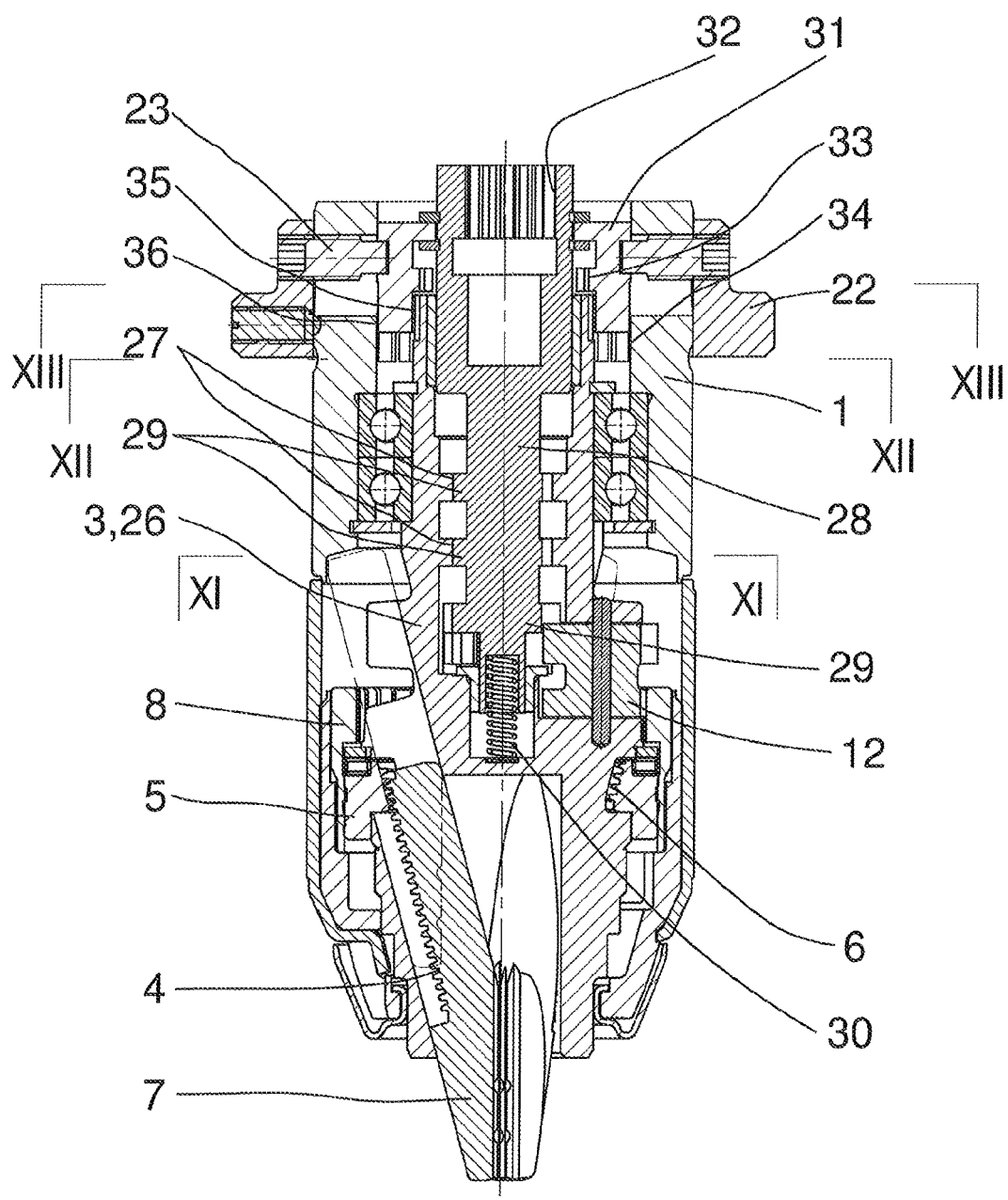

FIGS. 7 and 8 show the power drill in the adjustment position, in which the lowermost ring of external crown-gear teeth 29 on the spindle rod 28 forming the sun gear meshes with planet gears 12 and the other two rings of spindle crown-gear teeth 29 on the rod 28 are out of mesh with the spindle crown-gear teeth 27. A spring 30 that supports the spindle rod 28 and forces the rod 28 axially rearward into the drilling configuration is provided between the chuck sleeve 26 and the spindle rod 28. A driver ring 31 that interacts with an adjusting element 23 associated with an adjusting sleeve 22 coaxially surrounds the spindle rod 28 and housing 1. Usually a control cam is formed between the housing 1 and the adjusting element 23 and/or the adjusting sleeve 22, thus enabling the spindle rod 28 to be manually easily displaced axially between the adjustment position (FIGS. 7, 9, and 10) and drilling position (FIGS. 8, 11, 12, and 13).

In this embodiment, the motor 37 is directly connected to the spindle rod 28 that in the adjustment position part drives the planet gears 12 that mesh with the ring gear 13. The planet gears 12 are rotatable but angularly fixed on the planet carrier formed by the chuck sleeve 26 so that the ring gear 13 is rotated as a result of their being driven. The ring gear 13 shown here is rotationally connected to the threaded stem element 5 in mesh with teeth on the outer sides of the jaws 7. The spindle crown-gear teeth 29 are not in mesh with the chuck crown-gear teeth 27, thus enabling rotation of the spindle rod 28 relative to the rotationally fixed chuck body 3. In this adjustment or tightening/loosening position, the threaded stem element 5 is therefore driven by the motor 37 via the connection with the ring gear 13 and the planet gears 12 to drive the ring gear 13. This enables the jaws 7 in the fixed chuck body 3 to be displaced axially and radially.

The power drill from FIG. 7 is shown in FIG. 8 in the drilling configuration where the two inner or upper rings of spindle crown-gear teeth 29 are engaged with respective ones of the rings of chuck crown-gear teeth 27, thereby rotationally locking the rod 28 to the sleeve 26. Furthermore, a bearing 25 is provided between the housing 1 and the chuck sleeve 26 in these embodiments. The spindle rod 28 is displaced axially rearward by the adjusting sleeve 22, as a result of which the motor 37 rotates the spindle rod 28 and the chuck body 3 by engagement of the chuck crown-gear teeth 27 with the spindle crown-gear teeth 29. In the illustrated embodiment shown, the spindle rod 28 is also rotating with the planet gears 12, which however, in this drilling configuration, for their part no longer roll on the ring gear 13 however, as the ring gear 13 and the planet gears 12 are carried along with the rotation of the chuck body 3. Rotation of the chuck body 3 relative to the threaded stem element 5, which effects the displacement of the jaws 7, is prevented.

Figure 9:
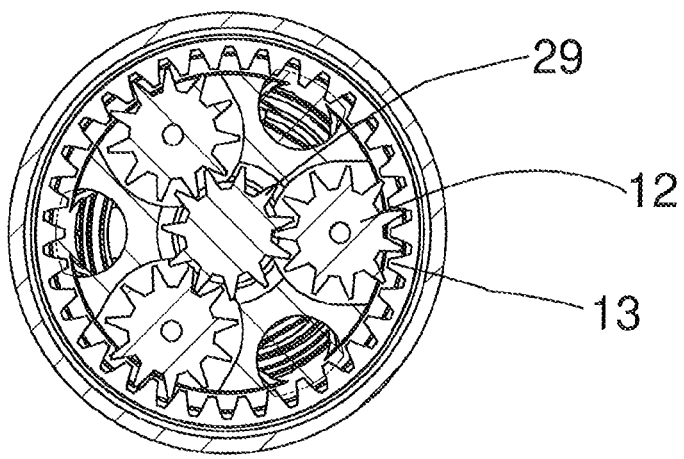
FIGS. 9 and 10 are sections taken along respective line IX-IX and X-X of FIG. 7.

FIG. 9 shows that in the tightening/loosening position the spindle crown-gear teeth 29 forming the sun gear 10 mesh with the planet gear 12s that for their part mesh with the drive sleeve 8 in the form of the ring gear 13.

Figure 10:
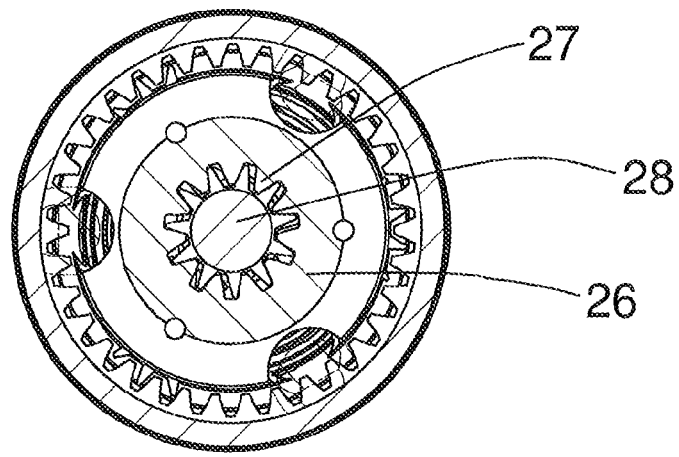

FIG. 10 shows that in the tightening/loosening position no part of the spindle rod 28 is engaged with the chuck crown-gear teeth 27 shown here, enabling the spindle rod 28 to rotate relative to the chuck sleeve 26.

Figure 11:
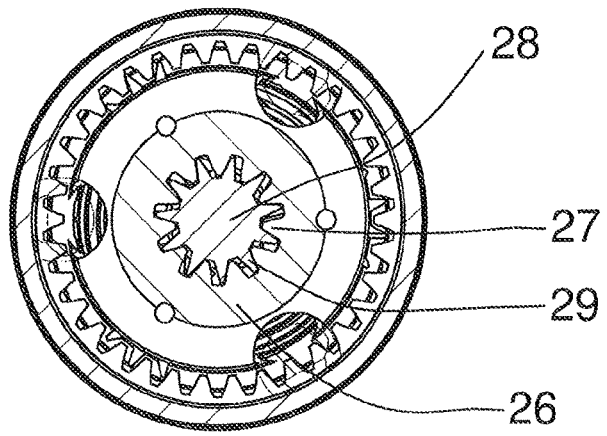
FIGS. 11, 12, and 13 are sections taken along respective lines XI-XI, XII-XII, and XIII of FIG. 8.

FIG. 11 shows that in the drilling position the spindle crown gear 29 is engaged with the chuck crown gear 27 and therefore, in the drilling configuration, the chuck sleeve 26 is carried along when the spindle rod 28 rotates.

Figure 12:
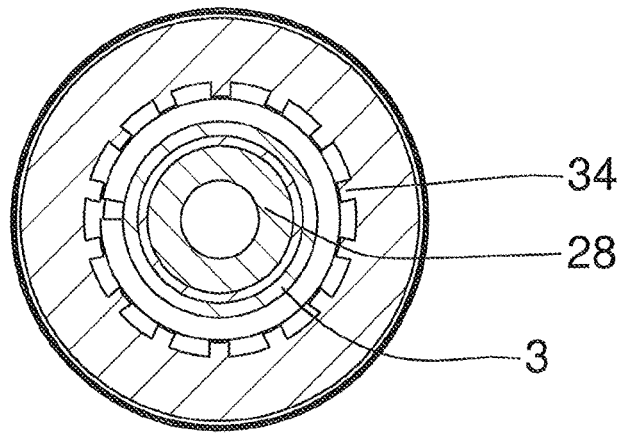
Figure 13:
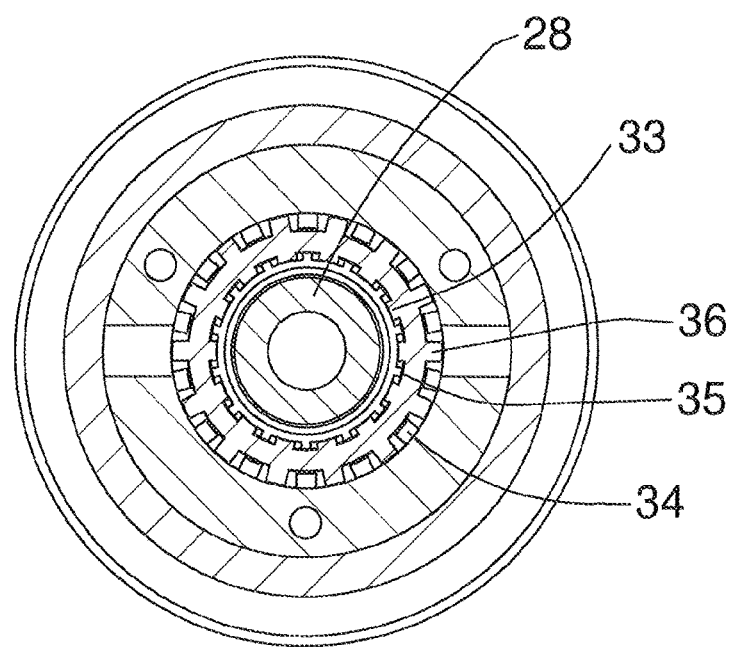

FIGS. 12 and 13 show that in the drilling position the driver ring 31 of the illustrated embodiment shown has a ring 33 of internal gear teeth and another ring 36 of external gear teeth. In addition, gear teeth 34 are formed on the housing 1. In the drilling configuration, the internal gear teeth 33 engage with the chuck-body teeth 35 and the external gear teeth 36 with the housing gear teeth 34. As a result, the chuck body 3 or chuck sleeve 26 is fixed. As well as gear teeth, other rotatably fixed connections between the above-mentioned parts are also conceivable.

I claim:

1. A drilling apparatus comprising:
   a housing 1;
   a motor 37 in the housing 1;
   a drive spindle 28 rotatable by the motor 37 about an axis A on the housing 1, axially shiftable between a drilling position and an adjustment position, and having at least one ring of external teeth 29 forming a sun gear of a planetary-gear transmission;
   a chuck sleeve 26 forming a planet carrier of the transmission and formed with at least one ring of internal teeth 27 surrounding the drive spindle 28 and meshable with the at least one ring of external teeth 29, the external teeth 29 of the spindle 28 meshing in the drilling position with the internal teeth 27 of the sleeve and being in the adjustment position out of mesh with the internal teeth 27 of the sleeve 26;
   at least one planet gear 12 of the transmission carried on the chuck sleeve 26 and meshing with the ring of external teeth 29 of the drive spindle 28;
   a plurality of jaws 7 shiftable in the chuck sleeve 26 and having external screwthread teeth;
   a drive sleeve 5, 8 forming a ring gear 13 of the transmission, meshing with the at least one planet gear 12, and having an internal screwthread 6 meshing with the external screwthread teeth of the jaws 7; and
   means for shifting the chuck sleeve 26 and drive spindle 28 relatively axially between the drilling position and the adjustment position.

2. The drilling apparatus defined in claim 1, further comprising
   a spring braced between the chuck sleeve 26 and the drive spindle 28 and urging the drive spindle 28 into the drilling position.

3. The drilling apparatus defined in claim 1, wherein the means is an adjustment ring outside the housing 1 and axially coupled to the drive spindle 28.

4. The drilling apparatus defined in claim 3, further comprising:
   a connector extending between the adjustment ring and the drive spindle 28.

* * * * *